United States Patent Office 3,529,996
Patented Sept. 22, 1970

3,529,996
WELDING ELECTRODE
Joseph F. Quaas, Island Park, N.Y., and A David Joseph, New Canaan, Conn., assignors to Eutectic Welding Alloys Corporation, New York, N.Y., a corporation of New York
No Drawing. Filed May 16, 1967, Ser. No. 638,732
Int. Cl. B23k 35/34, 35/36
U.S. Cl. 117—205       5 Claims

ABSTRACT OF THE DISCLOSURE

An electrode capable of depositing on a base metal a weld deposit of a highly alloyed nickel base alloy containing molybdenum, chromium and tungsten with the alloy deposit being capable of being work hardened. The electrode having a low alloy nickel core wire and a high alloy containing flux coating.

---

This invention relates generally to welding electrodes and more particularly to an improved nickel chrome molybdenum tungsten electrode.

Heretofore it has been known that electrodes of the type that are capable of depositing by welding, deposits composed of nickel with molybdenum, chromium, tungsten and iron additives in various amounts, provide overlays with corrosion oxidation resistant properties that are extremely desirable in corrosion sensitive applications. In addition, these overlay weld deposits which are of the following general composition:

| Constituent: | Percent by wt. |
|---|---|
| Molybdenum | 15–17 |
| Chromium | 14.5–16.5 |
| Tungsten | 3–4.5 |
| Iron | 4–7 |
| Manganese | 1 maximum |
| Silicon | 1 maximum |
| Nickel | Balance |

(which hereinafter for the sake of clarity shall be referred to as "the composition") can be work hardened thus having valuable utility in heavy impact applications. Known welding electrodes capable of weld depositing overlays of the above outlined composition utilize as an essential component, cores composed of the above outlined composition, which inherently endows these prior art electrodes with a number of undesirable characteristics. First, the prior art electrodes are expensive by virtue of the fact that the hardening characteristics of this alloy make the core wire difficult and costly to manufacture. In addition, the prior art electrodes are subject to secondary slag problems.

It is the general object of this invention to provide electrodes capable of depositing by welding overlays of the composition which are less expensive than the prior art electrodes.

Still another object of this invention is to provide electrodes with excellent wetability characteristics and the ability to be utilized with both alternating and direct currents.

Yet another object of this invention is to provide an electrode that can be weld deposited with power from AC low open circuit power sources.

A further object of this invention is to provide an electrode for weld depositing an overlay with easily removable slag.

The stated objects of the present invention and other objects which shall become apparent as the description proceeds, are achieved by providing a welding electrode comprising a nickel core with a flux coating on the core. The flux coating has active flux agents, powdered metallic materials and a binder intermixed with the flux which adheres it upon the core. The core wire of the electrodes of the present invention is a rod composed of substantially nickel but which can range from 96% pure nickel to relatively 100% pure nickel.

The flux coating of this invention to be applied upon the core rod may be formulated in accordance with the following table which provides ranges of percentages by weight for each of the constituents as indicated:

DRY FLUX

| Constituent | Range | Preferred range |
|---|---|---|
| 1.—Flourides | 2.5–4.5 | 2.8–3.8 |
| 2.—Carbonates | 9.8–12.5 | 10.8–12 |
| 3.—Titanium bearing materials | 19–29 | 21–22.5 |
| 4.—Clay | 1.8–4.3 | 2.4–3.2 |
| 5.—Organic slip agents | 1.4–3.5 | 1.6–2.1 |
| 6.—Molybdenum | 21–24 | 21.2–23 |
| 7.—Chromium | 24–28 | 24–26 |
| 8.—Tungsten | 5–17 | 5.5–7.9 |
| 9.—Iron | 3.5–9 | 4.5–7.7 |
| 10.—Manganese | 1–3.0 | 1.5–2.8 |

Examples of effective flourides that can be utilized as constituent (1) are calcium fluoride or sodium flouride. Effective carbonates that can be used as constituent (2) are calcium carbonate or strontium carbonate. Effective titanium bearing materials (constituent 3) can be titanium dioxide or potassium titanate. Useful organic slip agents (constituent 5) can be sodium carboxy methylcellulose, algin or gumarabic.

The metallic molybdenum, chromium, tungsten, iron and manganese powders of constituents 7 to 10 range in particle size essentially from 20 mesh and finer.

The above outlined dry flux as will be understood by those skilled in the art is mixed by use of known mixing apparatus, with a binder on a percent weight basis of 70 to 85 percent dry flux mixed with 15 to 30 percent binder with the preferred range being 74 to 82 percent dry flux mixed with 18 to 26 percent binder. The binder can be most of the known binders such as for example, sodium silicate and water mixed for the basis of 91 to 95 percent sodium silicate with 5 to 9 percent water. The flux coating applied to the core wire ranges from 40 to 60 percent by weight of percentage flux coating relative to the core weight.

Extensive tests of overlay weld deposits from the electrodes of this invention have confirmed that these weld deposits comprise the composition chemistry and the attendant corrosive resistance, oxidation resistance and work hardening characteristics. In addition, the electrodes of the present invention provide a number of additional beneficial characteristics such as their utility in horizontal position welding, excellent wetability of the base metal, ease of slag removal from the weld deposit and the ability of the electrode to be worked with both AC and DC current. A particular advantage for the electrodes of the invention is their utility with current from AC low open circuit power sources which as will be understood by those skilled in the art are the inexpensive low power output units. Further, since the nickel core wire is much easier and cheaper to manufacture, the present electrodes are less expensive than the prior art electrodes for depositing the composition.

What is claimed is:
1. An electrode capable of depositing a nickel base alloy containing molybdenum, chromium, tungsten and iron comprising a nickel core, a flux coating on said core, said flux coating comprising the following dry flux constituents in the weight percentages indicated:

| Constituent: | Percent by wt. |
|---|---|
| Fluorides | 2.5–4.5 |
| Calcium carbonate & strontium carbonate | 9.8–12.5 |
| Titanium bearing material | 19–29 |
| Clay | 1.8–4.3 |
| Organic slip agents | 1.4–3.5 |
| Molybdenum powder | 21–24 |
| Chromium powder | 24–28 |
| Tungsten powder | 5–17 |
| Iron powder | 3.5–9 |
| Manganese powder | 1–3 | and a binder intermixed with said flux which adheres it upon said concentration.

2. The electrode of claim 1 wherein said binder is mixed with said dry flux on a weight percentage basis of 70 to 85% dry flux mixed with 15 to 30% binder.

3. An electrode as set forth in claim 1 that has utility with alternating current from low open circuit power sources.

4. An electrode comprising a nickel core, a flux coating on said core, said electrode capable of depositing a nickel base alloy comprising 15 to 17 weight percent molybdenum, 14.5 to 16.5 weight percent chromium, 3 to 4.5 weight percent tungsten, 4 to 7 weight percent iron, and a maximum of 1 weight percent manganese wherein said flux coating has a dry flux composition with the following elements:

| Constituent: | Percent by wt. |
|---|---|
| Fluorides | 2.8–3.8 |
| Calcium carbonate & strontium carbonate | 10.8–12 |
| Titanium bearing materials | 21–22.5 |
| Clay | 2.4–3.2 |
| Organic slip agents | 1.6–2.1 |
| Molybdenum powder | 21.2–23 |
| Chromium powder | 24–26 |
| Tungsten powder | 5.5–7.9 |
| Iron powder | 4.5–7.7 |
| Manganese powder | 1.5–2.8 |

5. An electrode as set forth in claim 4 wherein said electrode is capable of providing a weld deposit with alternating and direct current.

References Cited

UNITED STATES PATENTS

| | | | |
|---|---|---|---|
| 3,423,565 | 1/1969 | Malchaire | 117—206 |
| 3,23g,405 | 2/1966 | Quaas | 117—206 |
| 3,211,582 | 10/1965 | Wasserman et al. | 117—206 |
| 1,972,067 | 8/1934 | Pennington | 117—206 |

ALFRED L. LEAVITT, Primary Examiner

M. F. ESPOSITO, Assistant Examiner

U.S. Cl. X.R.

117—128, 130, 202, 206, 207, 221